US007701610B2

(12) United States Patent
Mikami

(10) Patent No.: US 7,701,610 B2
(45) Date of Patent: Apr. 20, 2010

(54) IMAGE PROCESSING APPARATUS CAPABLE OF PRINTING WITH SUBSTITUTE RECORDING AGENT AND IMAGE PROCESSING METHOD

(75) Inventor: Fumio Mikami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1048 days.

(21) Appl. No.: 11/005,267

(22) Filed: Dec. 6, 2004

(65) Prior Publication Data

US 2005/0219602 A1 Oct. 6, 2005

(30) Foreign Application Priority Data

Dec. 8, 2003 (JP) ............................ 2003-409651

(51) Int. Cl.

| | |
|---|---|
| ***G06F 15/00*** | (2006.01) |
| ***G06K 1/00*** | (2006.01) |
| ***H04N 1/60*** | (2006.01) |
| *G06K 15/00* | (2006.01) |
| *H04N 1/405* | (2006.01) |

(52) U.S. Cl. ........................................ 358/1.9; 358/3.1

(58) Field of Classification Search ..................... 347/6; 358/1.15, 1.14; 399/8, 9, 27

See application file for complete search history.

(56) References Cited

U.S. PATENT DOCUMENTS

| | | | | |
|---|---|---|---|---|
| 6,264,305 | B1 * | 7/2001 | Inui et al. | 347/40 |
| 6,275,600 | B1 * | 8/2001 | Banker et al. | 382/112 |
| 2001/0003457 | A1 * | 6/2001 | Doi | 347/5 |
| 2002/0163570 | A1 | 11/2002 | Phillips | |
| 2003/0001918 | A1 * | 1/2003 | Tsuchiya et al. | 347/19 |
| 2003/0016391 | A1 * | 1/2003 | Tamura | 358/1.16 |
| 2003/0184798 | A1 * | 10/2003 | Enomoto et al. | 358/1.15 |
| 2004/0105123 | A1 * | 6/2004 | Fritz et al. | 358/1.16 |

FOREIGN PATENT DOCUMENTS

| | | |
|---|---|---|
| JP | 3-5156 | 1/1991 |
| JP | 5-158293 | 6/1993 |
| JP | 6-67507 | 3/1994 |
| JP | 8-90767 | 4/1996 |

(Continued)

OTHER PUBLICATIONS

Adobe Systems Incorporated, How to Print Multiple Photoshop Images on One Sheet of Paper, Nov. 13, 2001.*

*Primary Examiner*—Douglas Q Tran
(74) *Attorney, Agent, or Firm*—Canon USA Inc IP Div

(57) ABSTRACT

An image processing apparatus for supplying print data to a printing apparatus that performs printing with recording agents. The image processing apparatus includes a print-data generation unit for generating a predetermined group of print data for continuous printing, a remaining-amount detection unit for detecting the remaining amount of each of the recording agents, and a comparison unit for obtaining an estimated consumption of at least one of the recording agents required to print the print data if the one recording agent is substituted for another recording agent to perform printing and comparing the estimated consumption with the remaining amount of the corresponding recording agent. The image processing apparatus further includes a print control unit for controlling the printing apparatus to print the print data if the remaining amount of at least the one recording agent exceeds its estimated consumption.

2 Claims, 16 Drawing Sheets

FOREIGN PATENT DOCUMENTS

| | | | |
|---|---|---|---|
| JP | 10-258530 | A1 | 9/1998 |
| JP | 10-329337 | | 12/1998 |
| JP | 2002-283591 | | 10/2002 |
| JP | 2003-50693 | | 2/2003 |
| JP | 2003-140509 | | 5/2003 |

* cited by examiner

IMAGE PROCESSING APPARATUS CAPABLE OF PRINTING WITH SUBSTITUTE RECORDING AGENT AND IMAGE PROCESSING METHOD

BACKGROUND OF THE INVENTION

1. Field of the Invention

The present invention relates to image processing apparatuses and image processing methods for forming images.

2. Description of the Related Art

If a recording agent, such as toner, runs out or the amount of the recording agent becomes too insufficient to perform printing, in many cases printing is continued without the recording agent or is aborted to prompt the user to replenish the recording agent. In such a case, printing is often continued without the recording agent for ink-jet printing apparatuses, whereas printing is often aborted for electrophotographic printing apparatuses.

If printing is continued without the recording agent, that is, if printing is continued without a particular color, the subsequent images have colors or gray levels differing greatly from those intended. On the other hand, aborting printing prematurely is problematic especially while, for example, many sheets are being printed out from the printing apparatus after the user has issued a printing command.

To solve these problems, Japanese Patent Laid-Open No. 10-258530 proposes that if a particular recording agent runs out during printing, printing be continued with the recording agent of a different color. If, for example, light cyan (LC) ink or light cyan (LC) toner runs out during printing in a six-color printer that uses toners or inks of light cyan (LC) and light magenta (LM) in addition to yellow (Y), magenta (M), cyan (C), and black (K), then the C ink or C toner is used in place for the LC ink or LC toner that has run out. Furthermore, if the K ink or K toner runs out during printing, the C, M, and Y inks or C, M, and Y toners are used instead.

However, substituting a recording agent for another recording agent during printing to continue printing may cause the image quality of the print image, such as the tint and density, to differ between before and after the recording agent is substituted. In particular, when many copies of a single image are to be printed out, a change in image quality between before and after substitution of a recording agent can easily be recognized.

SUMMARY OF THE INVENTION

The present invention is directed to a printing apparatus and a printing method for continuous printing even if the printing apparatus encounters a situation where a recording agent runs out or the amount of a recording agent becomes insufficient without causing a change in image quality between before and after this situation.

According to one aspect of the present invention, an image processing apparatus for supplying print data to a printing apparatus that performs printing with a plurality of recording agents including a first recording agent, includes: a print-data generation unit for generating a predetermined group of print data for continuous printing; a remaining-amount detection unit for detecting the remaining amount of each of the recording agents; and a comparison unit for obtaining an estimated consumption of at least the first recording agent to print the predetermined group of print data generated by the print-data generation unit, and comparing the estimated consumption with the remaining amount of the corresponding recording agent detected by the remaining-amount detection unit. The image processing apparatus further includes a print control unit for controlling the printing apparatus to print the predetermined group of print data responsive to the comparison unit comparing that the remaining amount of at least the first recording agent exceeds the estimated consumption of the corresponding recording agent.

According to another aspect of the present invention, an image processing method for supplying print data to a printing apparatus that performs printing with a plurality of recording agents including first and second recording agents, includes: generating a predetermined group of print data for continuous printing; detecting a remaining amount of each recording agent; obtaining an estimated consumption of at least the first recording agent if the first recording agent is substituted for the second recording agent to perform printing; and comparing the estimated consumption of the first recording agent with the remaining amount of the first recording agent detected in the detecting step. The image processing method further includes controlling the printing apparatus to print the predetermined group of print data if the remaining amount of the first recording agent detected in the detecting step exceeds the estimated consumption of the first recording agent obtained in the obtaining step.

Further, features and advantages of the present invention will become apparent from the following description of the embodiments (with reference to the attached drawings).

DESCRIPTION OF THE EMBODIMENTS

Embodiments according to the present invention will now be described in detail with reference to the drawings.

Figure 1:
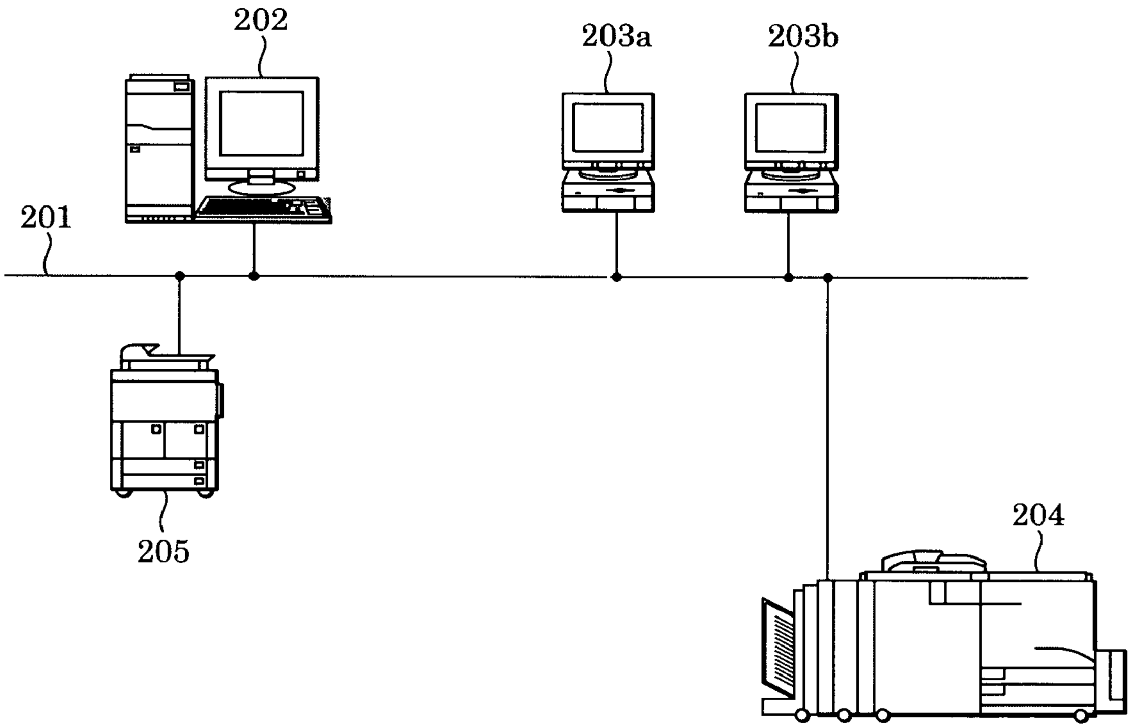
FIG. 1 is a diagram showing a print system according to an embodiment of the present invention.

FIG. 1 is a diagram showing a print system according to an embodiment of the present invention. Referring to FIG. 1, a print system according to this embodiment includes a computer 202 functioning as a server; a plurality of computers 203*a*, 203*b*, and other computers (not shown in FIG. 1) functioning as clients (hereinafter, these clients are collectively referred to as computers 203); a multi-function peripheral (MFP) 204; and a network 201 interconnecting the computer 202, the computers 203, and the MFP 204. The MFP 204 is an apparatus integrating various functions, such as scanning and printing in full color, and defines a printing apparatus according to this embodiment of the present invention. Furthermore, although not shown in the figure, other devices, such as another MFP, a scanner, a printer, and a facsimile machine, are connected to the network 201.

In each of the computers 203, application software for realizing so-called desk top publishing (DTP) is executed to generate and edit various documents and graphics. The computer 203 converts the generated documents/graphics into page description language (PDL) data, which is then sent via the network 201 to the MFP 204 for printing.

The MFP 204 has a communication device for exchanging information with the computers 202 and 203 via the network 201 to inform, as necessary, the computers 202 and 203 of information regarding the MFP 204 and the statuses of the MFP 204. Furthermore, the computers 202 and 203 have utility software that runs to receive such information regarding the MFP 204, so that the computers 202 and 203 can each manage the MFP 204.

Figure 2:
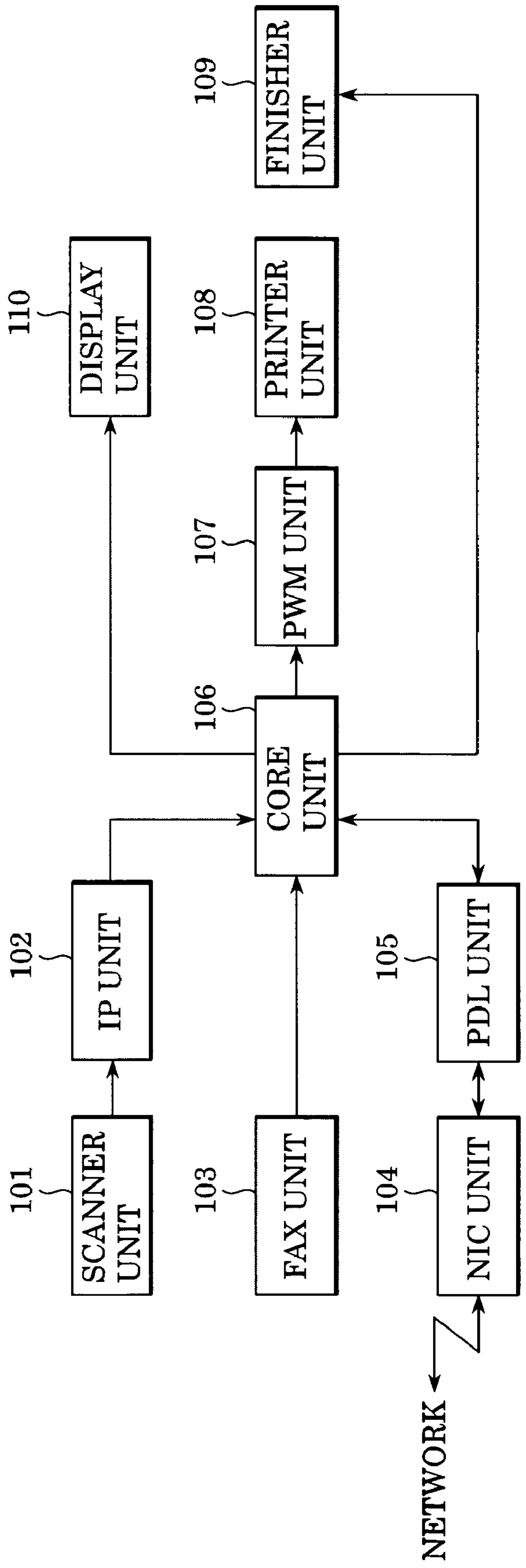
FIG. 2 is a block diagram showing the structure of the MFP shown in FIG. 1.

FIG. 2 is a block diagram of the structure of the MFP 204, showing specific components including various mechanisms, such as a printer engine, and control units for controlling the mechanisms, such as a CPU, a RAM, and a ROM, classified according to function. Thus, each type of processing to be described with reference to FIG. 11 and the subsequent figures is carried out by the CPU according to a program enabling each functional unit shown in FIG. 2 to execute the corresponding processing.

Referring to FIG. 2, the MFP 204 includes three groups related to print data acquisition. The first group includes a scanner unit 101 for reading image data and an image processing (IP) unit 102 for processing the image data. The second group includes a FAX unit 103, such as a facsimile device, for transmitting and receiving images via a telephone line. The third group includes a network interface card (NIC) unit 104 for exchanging image data and device information via the network 201 and a PDL unit 105 for developing page description language (PDL) data sent from the computer 203 via the NIC unit 104 into an image signal. According to a selective use of the three groups in the MFP 204, a core unit 106 temporarily stores an input image signal or determines a route along which such an image signal is supplied.

Image data output from the core unit 106 is sent to a printer unit 108 for performing image formation via a PWM unit 107. A sheet printed out by the printer unit 108, constituting the printer engine, is sent to a finisher unit 109 for sorting sheets. Furthermore, a display unit 110 is used to confirm the content of the image, preview the image before printing, or view a thumbnail image.

Figure 3:
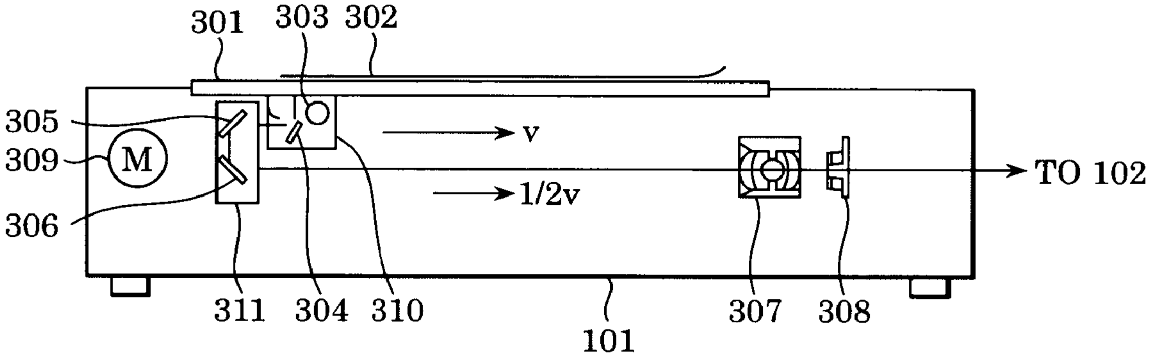
FIG. 3 is a diagram showing the structure of the scanner unit shown in FIG. 2.

FIG. 3 is a diagram showing the structure of the scanner unit 101 shown in FIG. 2. Referring to FIG. 3, a source document 302 to be read is placed on a document glass 301. The source document 302 is illuminated with an illumination lamp 303, and the reflected light is formed into an image on a CCD sensor 308 by a lens 307 via mirrors 304, 305, and 306. The image formed on the CCD sensor 308 is converted into an electrical signal, which is then sent to the IP unit 102. A first mirror unit 310 including the mirror 304 and the illumination lamp 303 moves at a speed v, whereas a second mirror unit 311 including the mirrors 305 and 306 moves at a speed ½v to scan the entire surface of the source document 302. The first mirror unit 310 and the second mirror unit 311 are driven by a motor 309.

Figure 4:
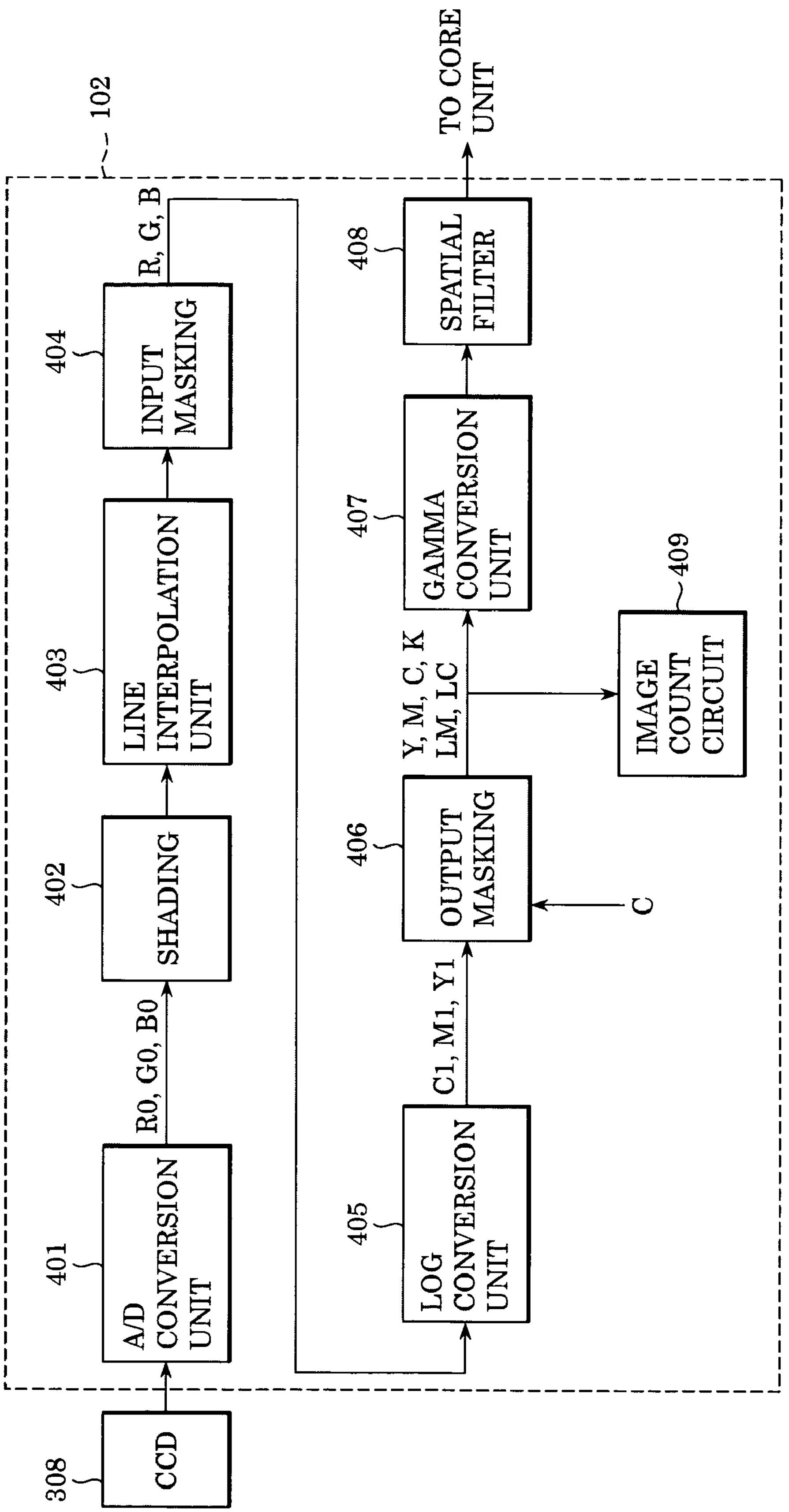
FIG. 4 is a block diagram showing the structure of the IP unit shown in FIG. 2.

FIG. 4 is a block diagram showing the structure of the IP unit 102 shown in FIG. 2. Referring to FIG. 4, as described above, the electrical signal from the CCD sensor 308 of the scanner unit 101 enters the IP unit 102. The CCD sensor 308 can be an RGB three-line color sensor. The R, G, and B electrical signals are converted into 8-bit digital image signals RO, GO, and BO, respectively, by an A/D conversion unit 401. Subsequently, a known shading correction is applied for each color by a shading correction 402 using a read signal of a reference white board. Furthermore, since the color line sensors of the CCD sensor 308 are arranged separated by a predetermined distance from one another, a spatial gap in the sub-scanning direction is corrected in a line delay adjustment circuit (line interpolation unit) 403.

Next, an input masking unit 404 converts a reading color space determined by the spectral characteristics of the R, G, and B filters of the CCD sensor 308 into a standard color space of NTSC. More specifically, a 3×3 matrix operation is carried out with device-specific constants taking into account characteristics, such as the sensitivity characteristics of the CCD sensor 308 and the spectral characteristics of the illumination lamp 303, to convert the input signals (RO, GO, and BO) into standard signals (R, G, and B). A luminance/density conversion unit (LOG conversion unit) 405 includes a lookup table (LUT) to convert the luminance signals R, G, and B into density signals C1, M1, and Y1.

Figure 13A:
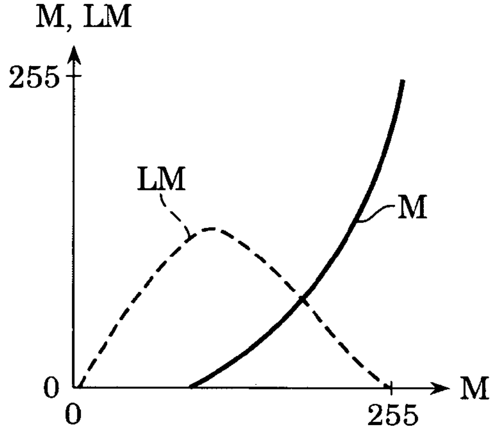
FIG. 13A shows a table used for standard distribution.
Figure 13B:
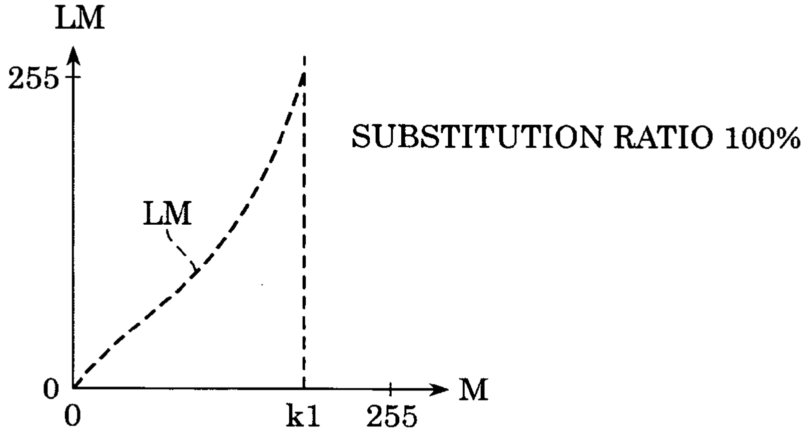
FIG. 13B shows a distribution table with a substitution ratio of 100% according to the first embodiment.

An output masking/UCR circuit 406 then converts the density signals C1, M1, and Y1 into color separation signals (color separation data) C, M, Y, K, LC, and LM, which respectively correspond to the toner colors used for printing in the printer unit 108. More particularly, for this conversion, C, M, Y, and K of the above-described signals (color components) are provided as grid point data of a color conversion LUT, and downstream of this LUT, two gradation distribution tables, to be describe later with reference to FIGS. 13A and 13B, are provided for each of the color components C and M. The gradation distribution tables for the C component convert the color separation data C into C-toner and LC-toner grayscale values, and the gradation distribution tables for the M component convert the color separation data M into M-toner and LM-toner grayscale values.

Figure 11:
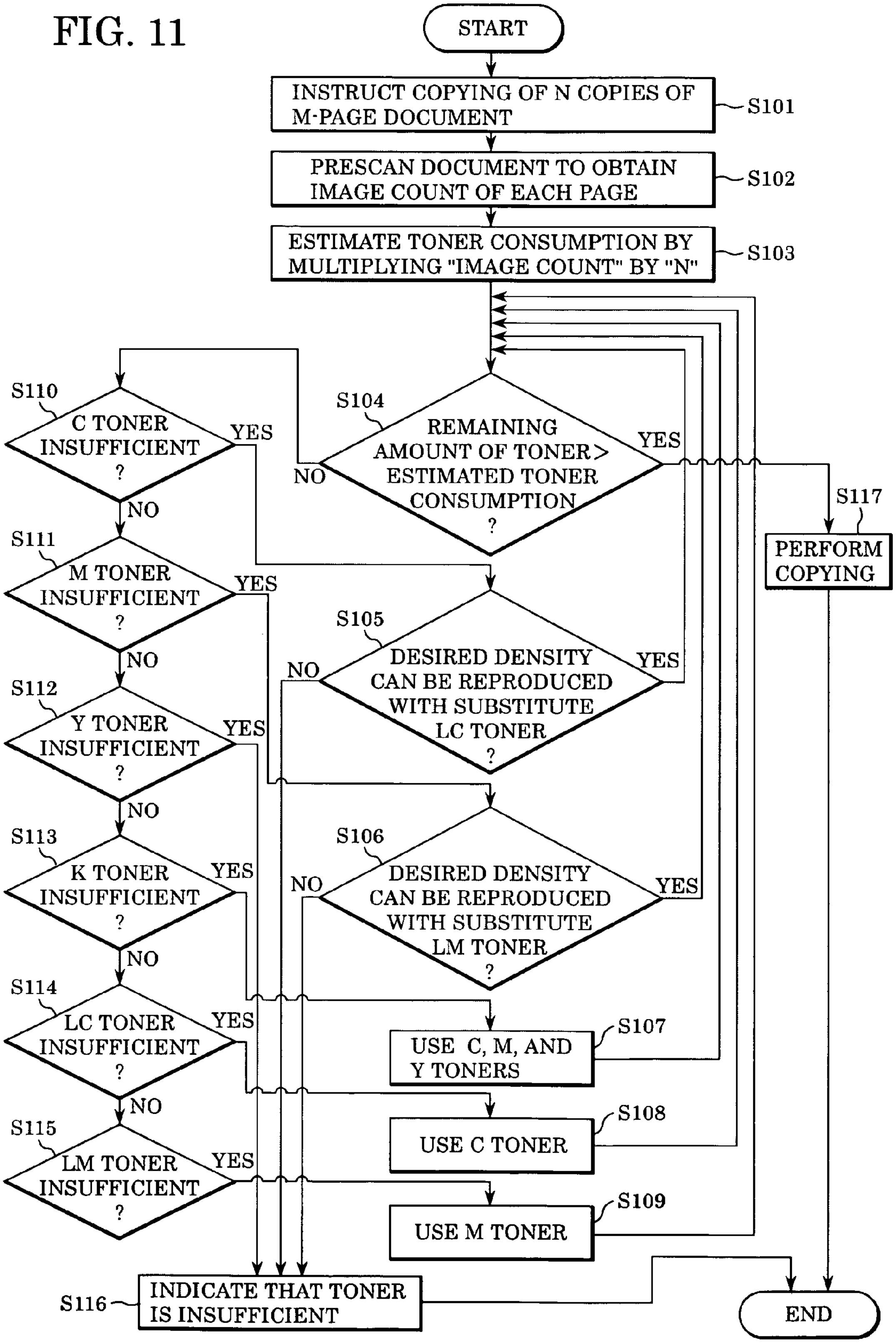
FIG. 11 is a flowchart showing the processing for copying a source document that is read by a scanner unit of an MFP according to a first embodiment of the present invention.

Furthermore, according to this embodiment, when toner substitution is carried out for the C or M toner, the corresponding two gradation distribution tables are switched, as described later with reference to FIG. 11 and the subsequent figures. Because of this, color separation data whose change due to toner substitution is corrected can be generated. Furthermore, another color conversion LUT used for substitution of Y, M, and C for the K toner, to be described later with reference to FIG. 11, is provided in addition to the above-described color conversion LUT. Switching of the gradation distribution tables and color conversion LUTs is carried out according to a control signal c. Furthermore, the color separation data Y, M, C, and K output from the LUT (and interpolation circuit) are temporarily stored in a buffer, and thereby the color separation data M and C can be supplied for a second generation of color separation data by toner substitution.

The values of the color separation signals C, M, Y, K, LC, and LM, which are output from the output masking 406 (and a gradation distribution table), are counted by an image count circuit 409 to obtain image count values representing the amounts of toners used for printing, as described later with reference to FIG. 11 and the subsequent figures.

The color separation signals C, M, Y, K, LC, and LM are further converted into image signals C, M, Y, K, LC, and LM by a gamma conversion unit 407, where tint characteristics of the toners and the density adjustment value by the user are taken into account based on a LUT. After edge enhancement or smoothing has been applied to the image signals C, M, Y, K, LC, and LM in a spatial filter 408, the image signals C, M, Y, K, LC, and LM are sent to the core unit 106.

Figure 5:
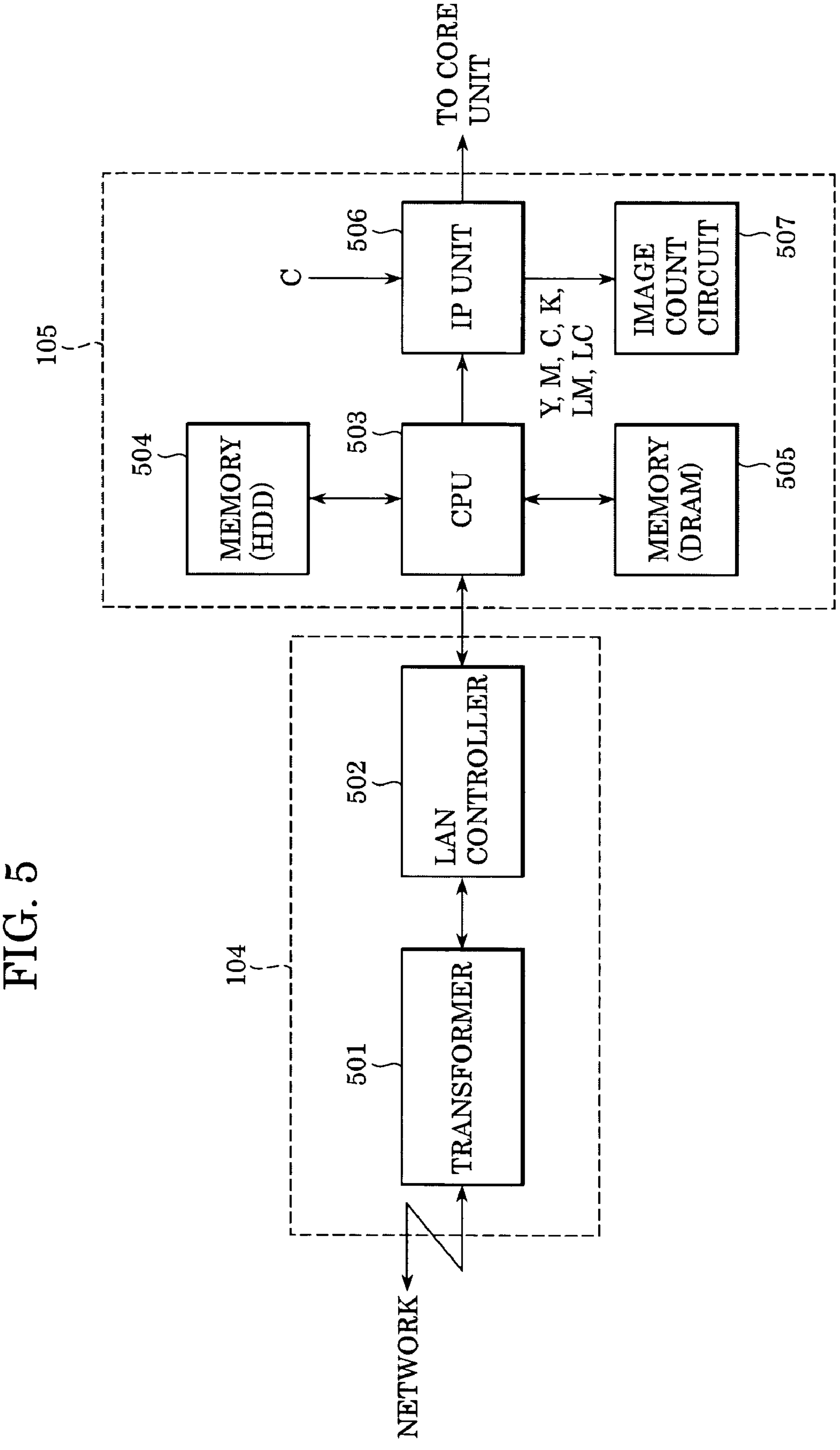
FIG. 5 is a block diagram showing the structures of the NIC unit and the PDL unit shown in FIG. 2.

FIG. 5 is a block diagram showing the structures of the NIC unit 104 and the PDL unit 105 shown in FIG. 2. As described above, the NIC unit 104 functions as an interface with the network 201. For example, the NIC unit 104 receives information from external units and transmits information to external units via an Ethernet® cable, such as 10Base-T or 100Base-TX. When information is to be received from an external unit, the information is first subjected to voltage conversion in a transformer unit 501, and is then sent to a LAN controller unit 502. The LAN controller unit 502 includes therein a first buffer memory (not shown in the figure). Information determined to be necessary is sent to a second buffer memory (not shown in the figure) and is then sent to the PDL unit 105 as a signal. On the other hand, when information is to be sent to an external unit, data sent from the PDL unit 105 is provided with additional information required in the LAN controller unit 502 and is then transmitted over the network 201 via the transformer unit 501.

Referring to FIG. 5, the PDL unit 105 converts PDL data into raster data, which is then subjected to predetermined image processing and output to the core unit 106. More specifically, image data generated by the application software running on the computer 203 includes documents, graphics, and/or photographs, etc. In other words, such image data is described in a page description language (PDL) composed of a combination of image description elements such as character codes, graphics codes, raster image data, etc. Adobe's Postscript® language is an example of such a page description language. In the PDL unit 105, PDL data sent from the NIC unit 104 is first stored in a large capacity memory 504, such as a hard disk (HDD), via a CPU 503, and managed and saved for each job. Then, as required, the CPU 503 carries out rasterization called Raster Image Processing (RIP) to develop the PDL data into raster data. The developed raster data is then subjected to color separation and gradation distribution in an IP unit 506, as with the IP unit 102 shown in FIG. 4, to generate color separation data C, M, Y, K, LC, and LM. Furthermore, the color separation data C, M, Y, K, LC, and LM are subjected to gamma conversion. The data C, M, Y, K, LC, and LM subjected to the above-described image processing are stored in a high-speed accessible memory 505, such as a DRAM, in units of pages, classified according to job and color component, and then sent to the core unit 106 in synchronization with the printing by the printer unit 108.

The PDL unit 105 is provided with an image count circuit 507, as with the IP unit 102, for obtaining an image count value representing the amount of toner for each of C, M, Y, K, LC, and LM; this will be described with reference to FIG. 11 and the subsequent figures.

From the FAX unit 103 shown in FIG. 2, a bit map monochrome image is sent to the core unit 106. In this case, an image count value used for the processing to be described with reference to FIG. 11 and the subsequent figures is obtained in the FAX unit 103.

Figure 6:
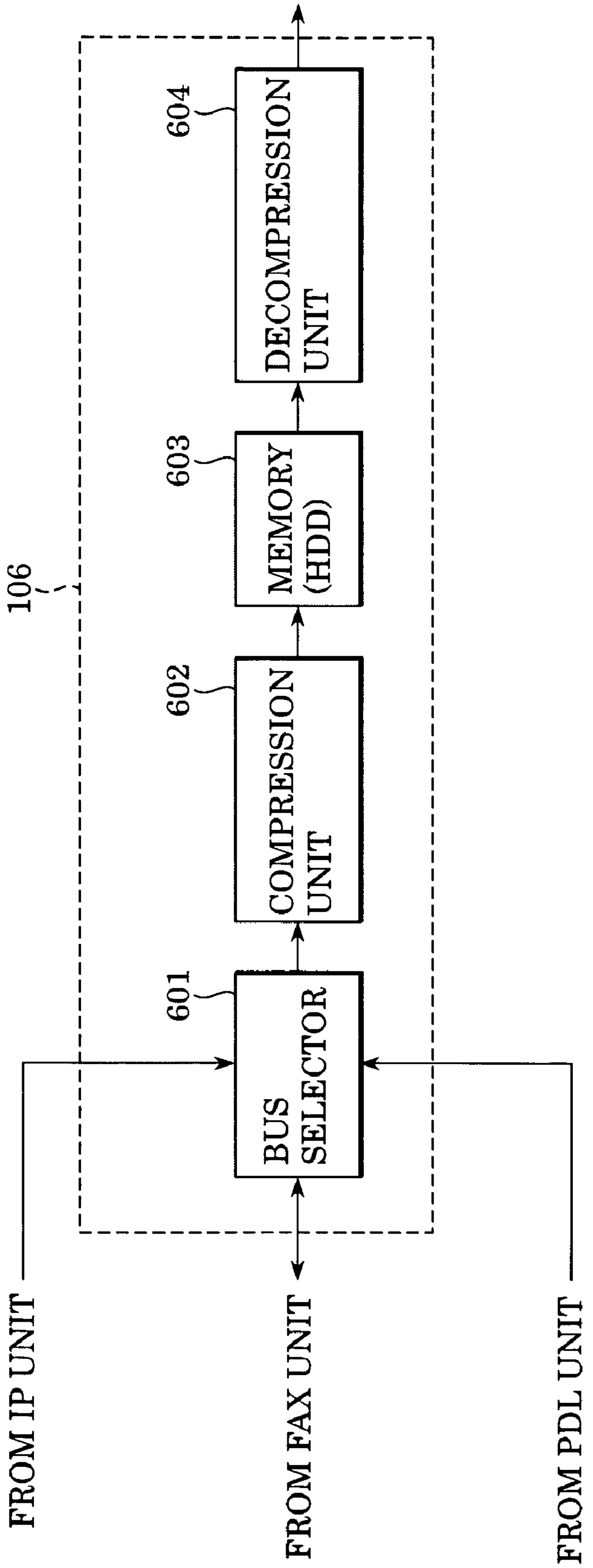
FIG. 6 is a diagram showing the structure of the core unit shown in FIG. 2.

FIG. 6 is a diagram showing the structure of the core unit 106 shown in FIG. 2. A bus selector 601 in the core unit 106 functions as a so-called traffic controller when the MFP 204 is used. In short, bus switching is carried out in the MFP 204 according to the intended function including the above-described three groups of functions related to data acquisition. More specifically, bus switching is carried out according to the copy function based on the scanner unit 101; the network scan or printer function via the NIC unit 104; the facsimile transmission/reception function based on the FAX unit 103; the display function based on the display unit 110; and the print function based on the printer unit 108.

Example patterns of bus switching for carrying out the functions according to this embodiment are shown below.

Copy function: scanner 101→core 106→printer 108

Network scan: scanner 101→core 106→NIC unit 104

Network printer: NIC unit 104→core 106→printer 108

Facsimile transmission function: scanner 101→core 106→FAX unit 103

Facsimile reception function: FAX unit 103→core 106→printer 108

Display function: scanner 101 or FAX unit 103 or NIC unit 104→core 106→display 110

When image data is to be sent to the printer unit 108 or the display unit 110 via bus switching as described above, image data output from the bus selector 601 is sent to the printer unit 108 (via the PWM unit 107) or to the display unit 110 via a compression unit 602, a large capacity memory unit 603, such as a hard disk (HDD), and a decompression unit 604. The compression scheme used by the compression unit 602 is not limited to a particular scheme. Any standard such as JPEG, JBIG, or ZIP can be used. Compressed image data is managed for each job, and stored with additional data such as the file name, creator, generation date/time, and file size. Furthermore, a personal box function may be supported by assigning a job number and password to store them with the image data. The personal box function enables temporary saving of data and allows only a particular person to perform printing (read the image data from the HDD). When the printout of a stored job is instructed, authentication is first carried out with a password, and the job is called from the memory unit 603 to undergo image decompression and then converted into raster image for printout by the printer unit 108.

Figure 7A:
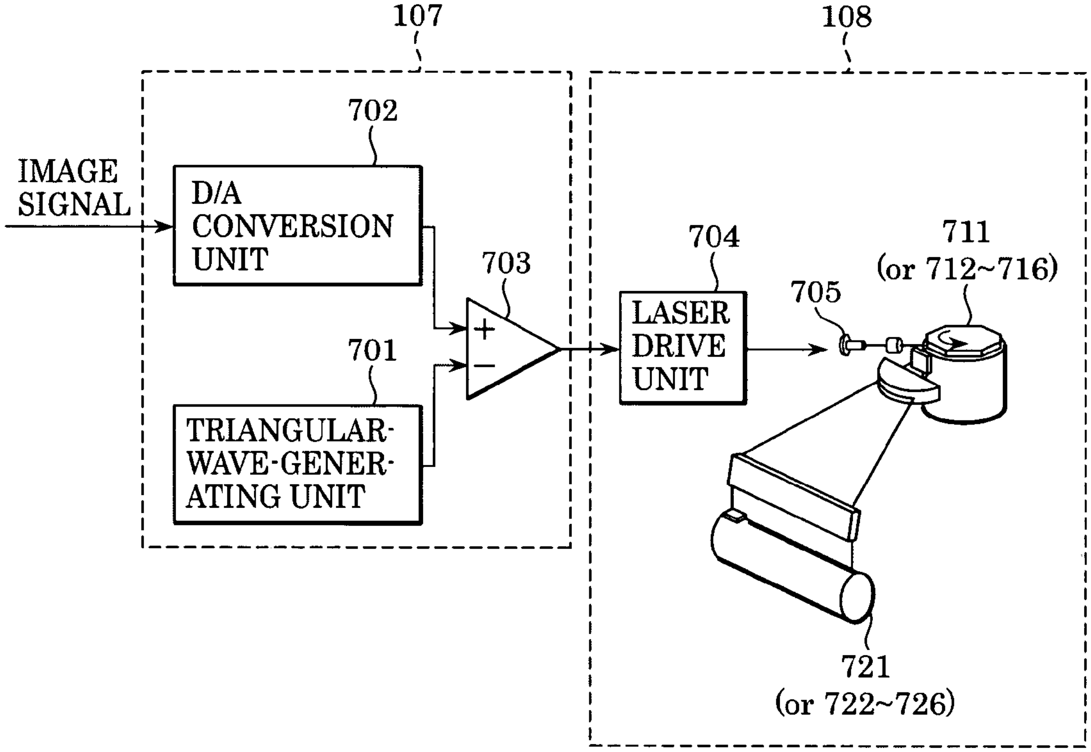
FIG. 7A is a diagram showing the structures of the PWM unit and the printer unit shown in FIG. 2.
Figure 7B:
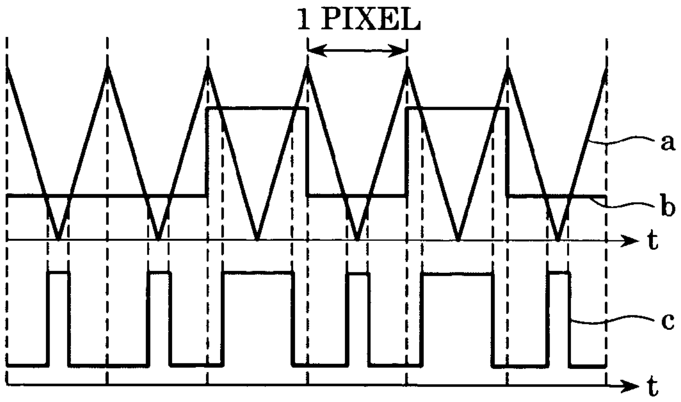
FIG. 7B is a diagram showing signals for driving the laser drive unit of the printer unit shown in FIG. 7A.

FIG. 7A is a diagram showing the structures of the PWM unit 107 and the printer unit 108 shown in FIG. 2. Multi-valued image data output from the core unit 106, including six colors of yellow (Y), magenta (M), cyan (C), black (K), light cyan (LC), and light magenta (LM), are converted by the respective PWM units 107 into drive signals that enter a laser drive unit 704 of the printer unit 108. Each of the PWM units 107 includes a triangular-wave-generating unit 701 and a D/A converter 702 for converting the input digital image signal into an analog signal. The triangular-wave generating unit 701 generates a triangular wave signal as shown in FIG. 7B. On the other hand, the D/A converter 702 converts the above-described multi-valued image signal into an analog signal b shown in FIG. 7B. A comparator 703 then compares the signal a with the signal b, and generates a signal c shown in FIG. 7B according to the comparison result, and sends the signal c to the laser drive unit 704. As a result, a laser oscillator 705 is driven according to the image signals C, M, Y, K, LC, and LM and thereby a laser beam is emitted from the laser oscillator 705. Thus, a laser beam corresponding to each of these color components can scan the corresponding one of photoconductor drums 721 to 726 via the corresponding one of polygonal scanners 711 to 716.

Figure 8:
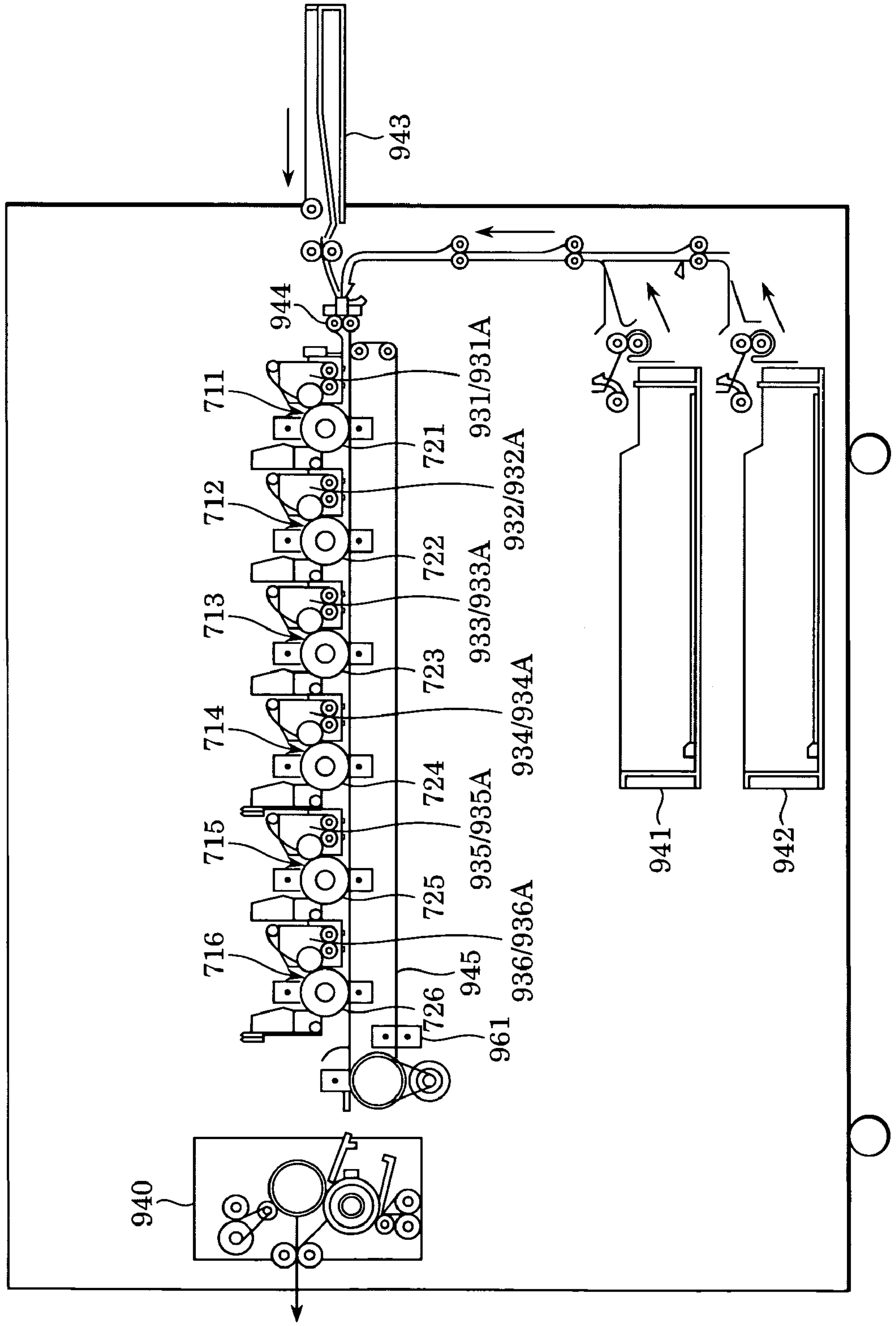
FIG. 8 is a diagram showing the mechanism of the printer engine in the printer unit shown in FIG. 2.

FIG. 8 is a diagram showing the mechanism of the printer engine in the printer unit 108. A laser beam corresponding to each color component described with reference to FIGS. 7A and 7B enters the corresponding one of the photoconductor drums 721 to 726 via the corresponding one of the polygonal scanners 711 to 716 to form a latent image according to the image data. FIG. 8 is a diagram showing that each drum is illuminated with a laser beam emitted from the corresponding polygonal scanner.

Referring to FIG. 8, development is carried out with a developing unit 931 for supplying the yellow (Y) toner by fixing the toner to the yellow latent image formed on the photoconductor drum 721. A magenta toner image is formed on the photoconductor drum 722 with a developing unit 932 for supplying the magenta (M) toner in the same manner. A cyan toner image is formed on the photoconductor drum 723 with a developing unit 933 for supplying the cyan (C) toner in the same manner. A black toner image is formed on the photoconductor drum 724 with a developing unit 934 for supplying the black (K) toner in the same manner. A light-cyan toner image is formed on the photoconductor drum 725 with a developing unit 935 for supplying the light cyan (LC) toner in the same manner. A light-magenta toner image is formed on the photoconductor drum 726 with a developing unit 936 for supplying the light magenta (LM) toner in the same manner. Toner images of the six colors (Y, M, C, K, LC, and LM) formed in this manner are transferred to a sheet to obtain a full-color printed image.

According to this embodiment, the remaining amount of toner for each color used for processing, to be described later with reference to FIG. 11 and the subsequent figures, is detected by the corresponding one of remaining-amount sensors 931A to 936A provided for the respective developing units 931 to 936. The structure of such a remaining-amount sensor is known to persons of ordinary skill in the art, and will not be described.

A sheet of printing paper supplied from one of sheet cassettes 941 and 942 and a manual-feed tray 943 reaches a conveyor belt 945 via a register roller 944, and the conveyor belt 945 transports the sheet. In synchronization with this paper-feed timing, a toner image of each color is pre-formed in the photoconductor drums 721 to 726 to transfer the toner images to the sheet as the sheet is transported. The sheet on which the toners of the multiple colors are transferred is separated from the conveyor belt 945 and passes through a printer fuser 940 to fix the toner images. The six photoconductor drums 721 to 726 are arranged at the same intervals, and the sheet is transported at a constant speed by the conveyor belt 945. With this synchronized timing, the six semiconductor lasers are driven.

Figure 9:
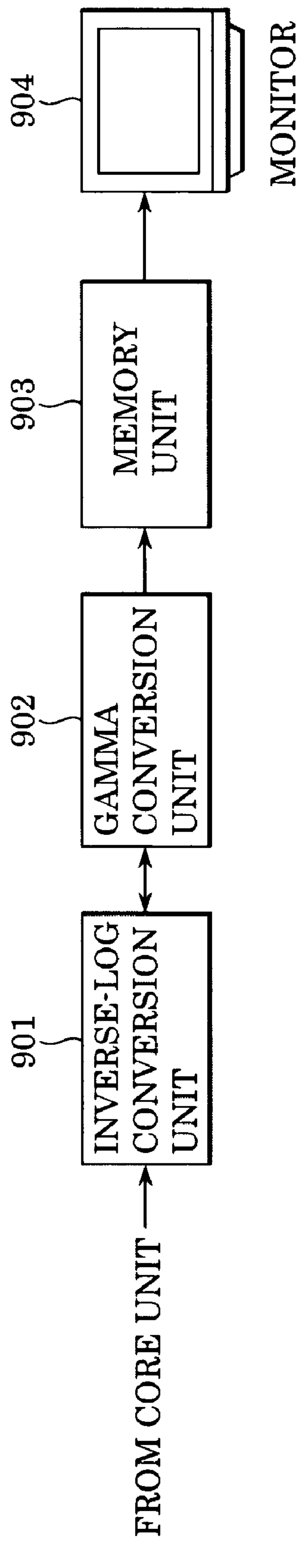
FIG. 9 is a block diagram showing the structure of the display unit shown in FIG. 2.

FIG. 9 is a block diagram showing the structure of the display unit 110 shown in FIG. 2. The image signals C, M, Y, K, LC, and LM output from the core unit 106 are converted into R, G, and B data with an inverse-LOG conversion unit 901. Then, to match the image signals to the color characteristics of a display device 904, such as a CRT, output conversion is carried by a gamma conversion unit 902 using a lookup table. The converted image data is stored in a memory unit 903 and displayed by the display device 904, such as a CRT.

The display unit 110 is used in this case to prevent wastage of print sheets by utilizing a preview function for pre-confirming the output image or a proof function for verifying that the output image is as intended or for checking whether the image really needs to be printed out. The display unit 110 is also used to confirm a thumbnail image according to the present invention.

Figure 10:
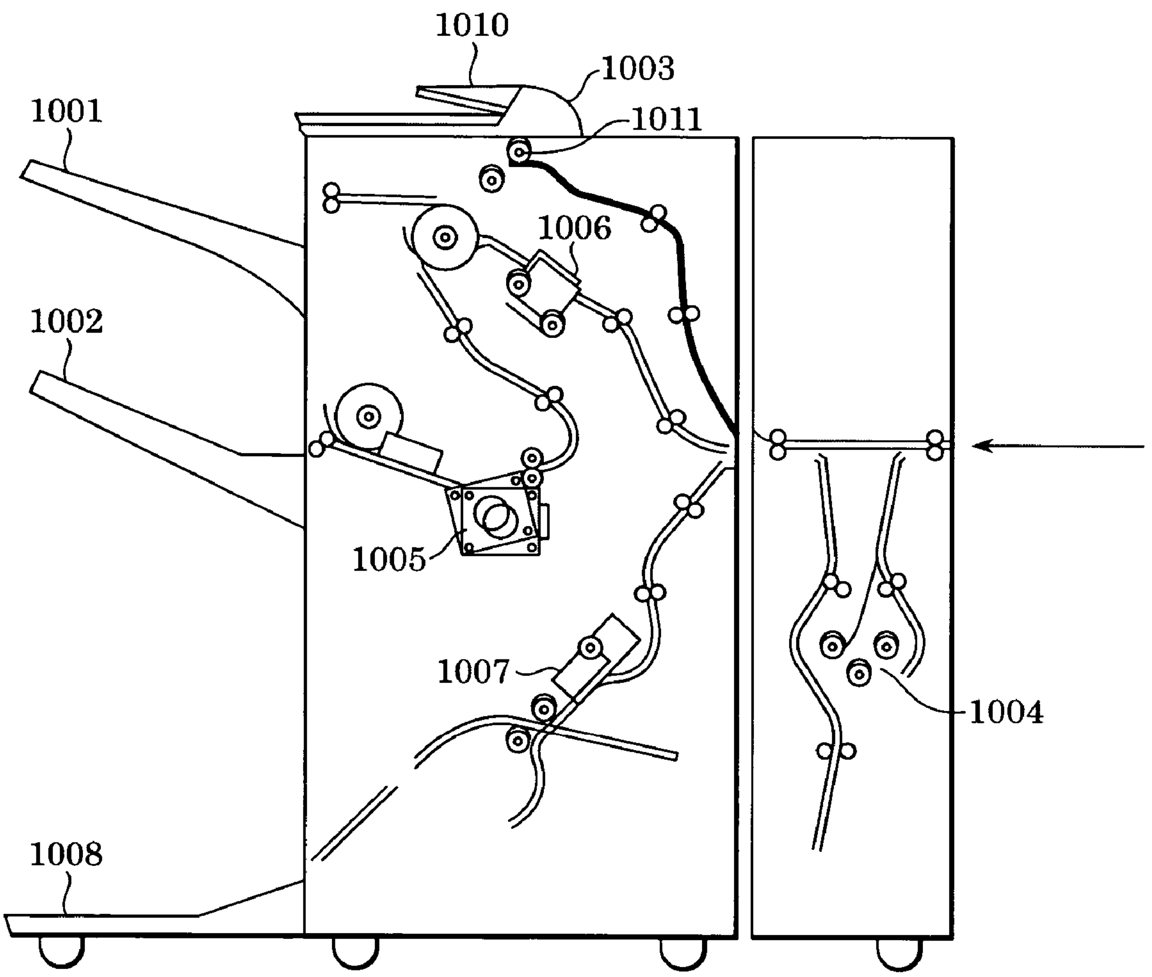
FIG. 10 is a schematic diagram showing the structure of the finisher unit shown in FIG. 2.

FIG. 10 is a schematic diagram showing the structure of the finisher unit 109 shown in FIG. 2. The sheet exiting the fusing unit 940 of the printer unit 108 enters the finisher unit 109. The finisher unit 109 includes a sample tray 1001 and a stack tray 1002. These trays are switched according to the job type and the number of sheets to be ejected.

Two sort methods are available. One of the two methods is a bin sort method for performing sorting to a plurality of bins. The other of the two methods is a shift sort method for shifting a bin (or tray) towards the far side and near side to sort the output sheets according to job. The electronic sort function is called a collate function, and is realized based on the large capacity memory referred to in the description of the core unit 106. Based on this buffer memory, an electronic sorting function can be supported by using the collate function, where the order of buffered pages and the order of ejection are switched. The grouping function sorts sheets according to page in contrast with the sorting function, which sorts sheets according to job.

Furthermore, when sheets are to be ejected to the stack tray 1002, the sheets can be stored according to job and bound with a stapler 1005 just before being ejected. In addition to the above described functions, a Z-folding unit 1004 for folding sheets into a Z shape and a puncher 1006 for punching two (or three) holes for filing before the sheets reach the above-described two trays are available. These units 1004 and 1006 function according to the job type.

Furthermore, a saddle stitcher 1007 binds at two locations near the center of the sheet and then has a roller pinch the center of the sheet to fold it in half to produce a booklet such as a magazine or a pamphlet. A sheet generated with the saddle stitcher 1007 is ejected to a booklet tray 1008.

Network utility software for the print system shown in FIG. 1 according to this embodiment will be briefly described. The utility software that runs on the computers 202 and 203 are described below. The network interface section (NIP unit 104 plus PDL unit 105) in the MFP 204 includes a standardized database called Management Information Base (MIB), and communicates with computers on the network via a network management protocol called the Simple Network Management Protocol (SNMP) to manage, for example, a scanner, a printer, a FAX, and the MFP 204 on the network. On the other hand, software programs called utilities run on the computers 202 and 203 to interchange necessary information using the MIB via the network based on the above-described SNMP.

The user can check information regarding the MFP 204 connected to the network on the computers 202 and 203 by the use of the MIB. Such confirmation includes sensing whether or not the finisher unit 109, which is an accessory of the MFP 204, is connected, sensing whether or not printing is now possible according to status information, and entering, changing, or confirming, for example, the name and installation location of the MFP 204. Furthermore, these items of information can be assigned read/write access rights differently for the server 202 and the client 203.

Thus, with this function, the user can obtain any information using the computers 202 and 203, i.e., information regarding the accessories, device status, network setting, job history, and usage status of the MFP 204. Embodiments of printing involving toner substitution, carried out in the above-described MFP 204 functioning as a printing apparatus according to an embodiment of the present invention and the print system including the MFP 204, will now be described.

First Embodiment

FIG. 11 is a flowchart showing the processing for copying a source document that is read by the scanner unit 101 of the MFP 204.

Referring to FIG. 11, first in step S101, a command for producing n copies of each page of a source document of m pages (sheets) is received. When the command for starting copying is received, in step S102 the source document is read and then the image value of each page is counted by the image count circuit 409 of the IP unit 102 based on the result of the reading. This image value is the sum of the grayscale values (one of 0 to 255) of the pixels constituting the image of one page for each item of color separation data. The sum of the image values of the m pages, calculated in this manner, is defined as an image count value.

Next in step S103, the product of the image count value for each color component obtained as described above and the number of copies n is calculated as an estimated consumption of the toner for each of the color components Y, M, C, K, LM, and LC. Then in step S104, the estimated consumption of the toner for each color component calculated as described above is compared with the remaining amount of toner for the corresponding component detected by the corresponding one of the remaining-amount sensors 931A to 936A described with reference to FIG. 8. Here, if the actual remaining amounts of all toners are more than the respective estimated consumption, i.e., copying can be continued without toner substitution, then copying is carried out in step S117.

In contrast, if a determination is made that the remaining amount of at least one toner is less than the corresponding estimated consumption, then the flow proceeds to steps S110 to S115, which are carried out sequentially. These steps are conditional steps for determining whether or not the remaining amounts of the C, M, Y, K, LC, and LM toners are sufficient. If the remaining amount of a toner is insufficient, the basic strategy is that the LC toner is substituted for the C toner, the LM toner is substituted for the M toner, the C, M, and Y toners are substituted for the K toner, the C toner is substituted for the LC toner, and the M toner is substituted for the LM toner. According to this embodiment, no toner is substituted for the Y toner.

Figure 12A:
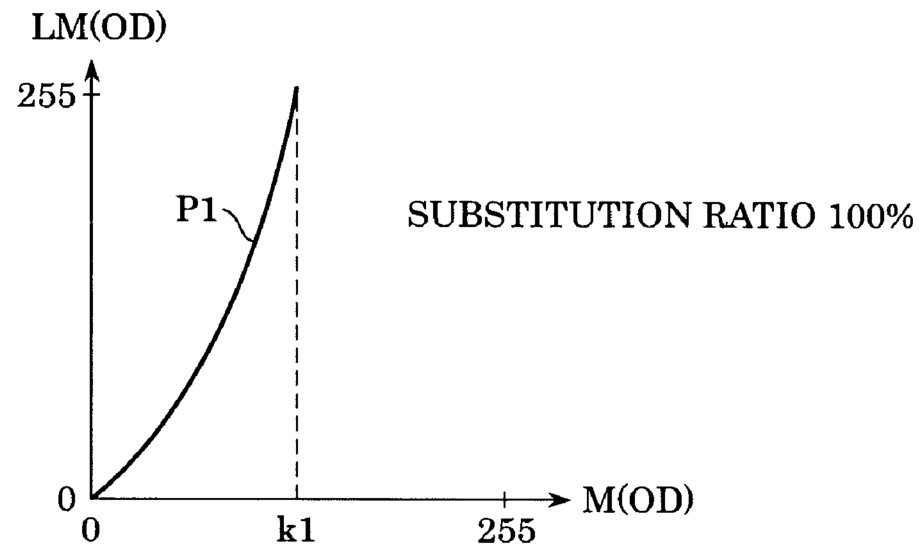
FIG. 12A is a curve showing the relationship between M toner densities and LM toner densities of data with the same grayscale values, where the LM toner is substituted for 100% of the M toner.

If the remaining amounts of the C and M toners are insufficient in steps S110 and S111, respectively, another determination is made in steps S105 and S106, respectively, as to whether or not the LC toner can be substituted for the C toner and the LM toner can be substituted for the M toner to reproduce the desired image density. The determinations in step S105 and step S106 are made because if the substitute toner produces lower density than that produced by the insufficient amount of toner, the desired density of the resultant image data may not be obtained. The determinations in step S105 and step S106 are made as described below. According to this embodiment, toner substitution in steps S104 to S109 is carried out with a substitution ratio of 100%. More specifically, when color separation data is generated in the output masking 406 of the IP unit 102, toner substitution is carried out such that the color separation data based on the insufficient amount of toner is not generated at all, and the amount of color separation data based on the substitute toner increases. FIG. 12A is a curve showing the relationship between the density (optical density: OD) of the M toner and the density (OD) reproduced with the LM toner over the entire gray scale, where the LM toner is substituted for 100% of the M toner for data with the same grayscale values. This relationship curve p1 is obtained by plotting the density levels of the pixels with the same grayscale values, where the density levels of the pixels are measured with a densitometer in a certain area of a page printed out with the M toner and the LM toner. As shown in FIG. 12A, the substitute LM toner cannot reproduce the desired density in the range with an M-toner density of k1 or more. Thus, a determination is made in step S106 as to whether or not the maximum value of the density corresponding to the grayscale value of the color component M at each pixel examined in step S102 exceeds the density k1. If the maximum value exceeds k1, i.e., if a determination is made that the substitute LM toner cannot produce the desired density, the flow proceeds to step S116.

If the maximum value of the examined density does not exceed the density k1, in step S106 the distribution table of the output masking 406 is switched to the table with a substitution ratio of 100% and the color separation data M is re-distributed to generate the color separation data LM.

FIG. 13A shows a table used for standard distribution, and FIG. 13B shows a distribution table with a substitution ratio of 100% used in this embodiment. In short, the standard distribution table shown in FIG. 13A is used to generate the color separation data M and LM referred to in step S102 of FIG. 11. In contrast, the distribution table with a substitution ratio of 100% shown in FIG. 13B is selected with the control signal c shown in FIG. 5 if a determination is made in step S106 of FIG. 11 that toner substitution as described above is carried out. This table shown in FIG. 13B is based on the standard distribution table shown in FIG. 13A, but in the table of FIG. 13B the value of the color separation data LM is determined such that when the color separation data LM is substituted for 100% of the color separation data M, the same density (OD) as that of the color separation data generated with the standard distribution table can be reproduced.

As shown in FIG. 13B, the distribution table with a substitution ratio of 100% converts the color separation data M into the color separation data LM only over all the grayscale values. It is noted, however, that the substitute LM toner cannot reproduce the desired density in the range of grayscale value k1 or more, as described above. As described above, when the substitute LM toner is used, the color separation data LM generated by the selected distribution table for substitution is output from the output masking circuit 406 shown in FIG. 4.

Figure 12B:
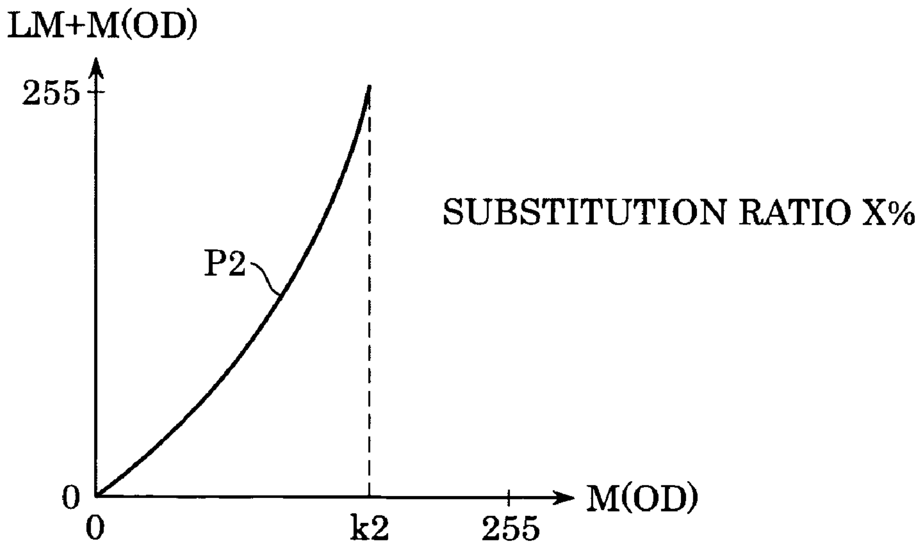
FIG. 12B is a curve showing the relationship between M toner densities and LM toner densities of data with the same grayscale values, where the LM toner is substituted for x % of the M toner.
Figure 13C:
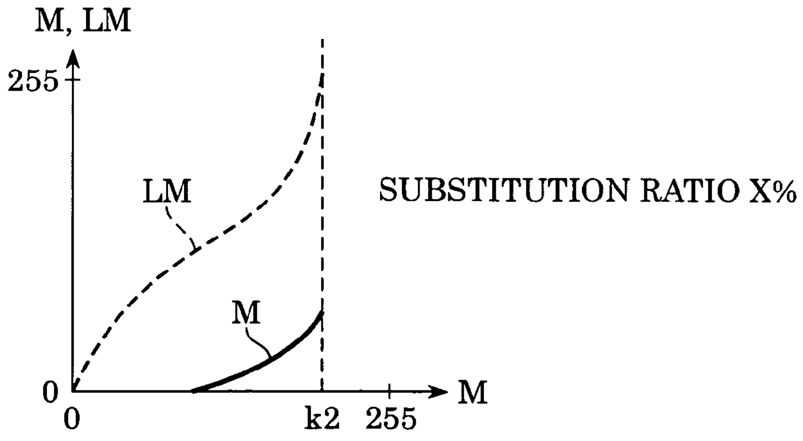
FIG. 13C shows a distribution table with a substitution ratio of x % according to the first embodiment.

Although the substitution ratio is 100% in the above-described example, the substitution ratio according to the present invention is not limited to 100% but can be set to a value x %, less than 100%. In this case, a relationship p2, as shown in FIG. 12B, similar to the relationship p1 is obtained. FIG. 13C shows a distribution table with a substitution ratio of x %, which can be selected when used. This table, as with the table with a substitution ratio of 100%, is based on the standard distribution table shown in FIG. 13A, but in the table shown in FIG. 13C the values of the color separation data M and LM are determined such that when the color separation data LM is substituted for the color separation data M at a ratio of x %, the same density (OD) as that of the color separation data generated with the standard distribution table can be reproduced. The expression "the color separation data LM is substituted for the color separation data M at a ratio of x %" means that when, for example, the value of the color separation data M (vertical axis) is reduced by x % for each of the grayscale values of the color component M (horizontal axis) shown in FIG. 13A, the level of the color separation data LM required to reproduce the same density (OD) as the density of the grayscale value is obtained. The curve p2 is obtained via such a substitution.

In step S106, a determination is made as to whether or not the maximum value of the density corresponding to the grayscale value of the color component M at each pixel exceeds a density k2 as represented with this curve p2. If the maximum value does not exceed the density k2, a second distribution is carried out with the table selected for use, shown in FIG. 13C.

The determination and the second distribution in step S105 are also made in the same manner as in step S106.

In steps S107 to S109, the distribution table according to the substitution ratio is selected for use to carry out a second distribution in the same manner as in steps S105 and S106, though a determination as to whether or not the desired density can be reproduced is not made in steps S107 to S109. In step S107, instead of a distribution table as described above, a color conversion table (LUT) for outputting C, M, and Y only is selected to carry out a second color conversion (masking).

If substitution is carried out in at least one of steps S105 to S109, all color components including the replaced color component and the substituted color component are again subjected to the same processing as in steps S102 and S103, and then in step S104 the estimated consumption of the toner is again compared with the remaining amount of toner. If a determination is made that there is an insufficient amount of toner, the processing in steps S105 to S109 is repeated for the corresponding color component.

Furthermore, if a determination is made that the amount of Y toner is insufficient in step S112 or that the desired density cannot be reproduced in step S105 or S106, a message indicating that the amount of toner is not sufficient is displayed on the user interface screen of the display unit 110.

According to the above-described processing based on this embodiment, when many pages, such as n copies of each page of a document of m pages, are output, a determination is made as to whether or not the copying of a predetermined unit (or group) of print data for continuous copying can be completed with a substitute toner, and, based on the determination, toner substitution is performed starting with the first page of the predetermined unit of print data. This prevents the image quality from differing among pages of the predetermined unit of print data because there is no possibility of the amount of toner becoming insufficient before the copying of the predetermined unit of print data is completed.

In the processing shown in FIG. 11, the user may be asked whether or not to accept copying of images with low density (OD) on the n copies of each of the m pages before a message indicating that the amount of toner is insufficient is displayed in step S116. If the user instructs copying with low density, the color conversion (masking) table and the distribution table are changed so as to match the decreased density to perform the same processing as that shown in FIG. 11.

Second Embodiment

Although the first embodiment relates to toner substitution in copying by the MFP 204, a second embodiment according to the present invention relates to toner substitution in printing based on PDL data of the MFP 204.

More specifically, the print driver of the client computer 203 generates print job data in the PDL format including image data to be printed out, based on information regarding the print density and the number of print copies specified via the interface. This print job is transmitted to the specified MFP 204 via the network 201. When the MFP 204 receives the PDL data transmitted from this client via the network 201, the processing shown in FIG. 14 is started by the PDL unit 105 via the NIC unit 104 and the CPU for controlling the PDL unit 105.

Figure 14:
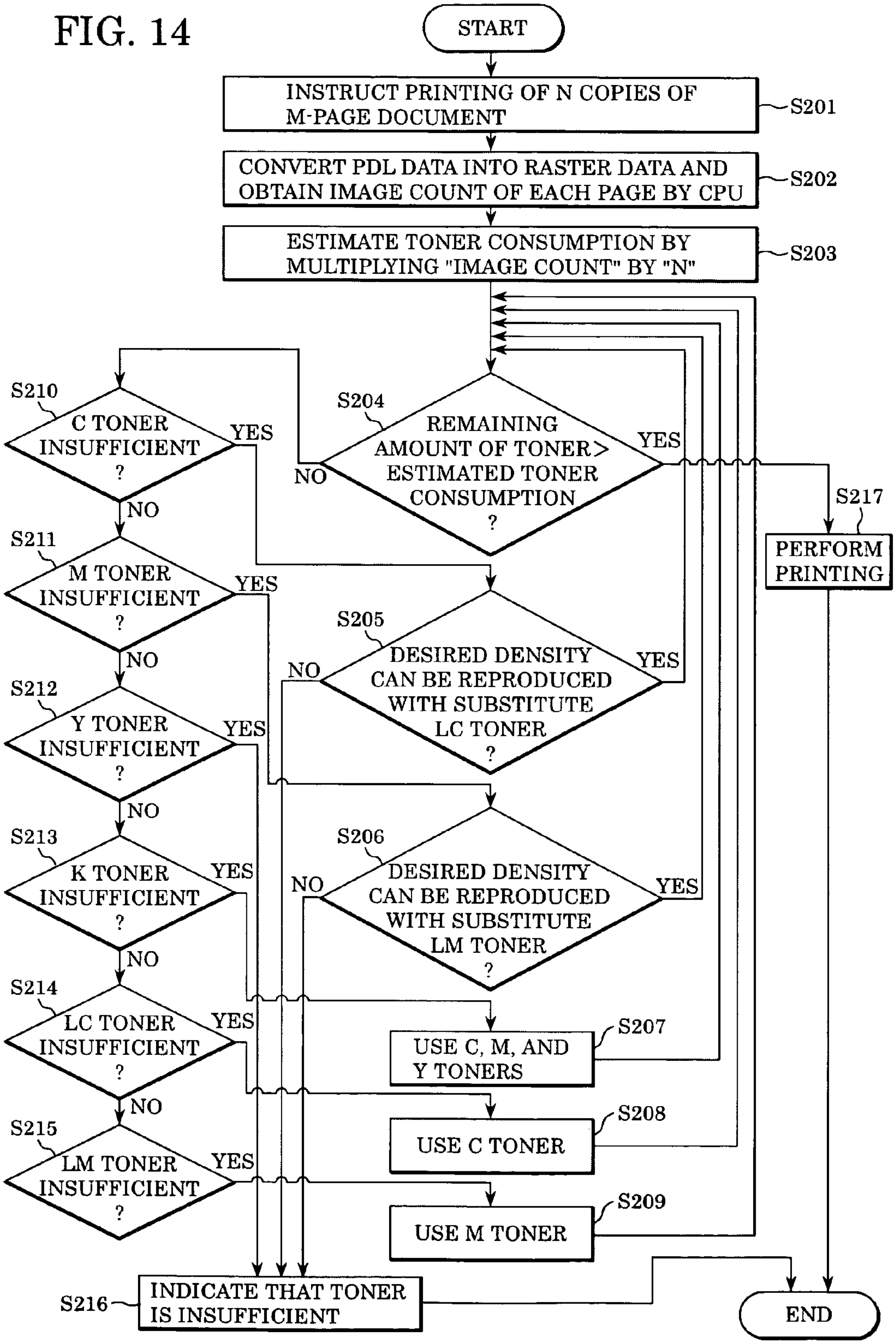
FIG. 14 is a flowchart showing print processing based on PDL data by an MFP according to a second embodiment of the present invention.

The processing shown in FIG. 14 is substantially the same as the processing described with reference to FIG. 11 and thus will not be described. However, color conversion (masking), the gradation distribution, and image counting are carried out by the IP unit 506 and the image count circuit 507 in the PDL unit 105.

Third Embodiment

Figure 15:
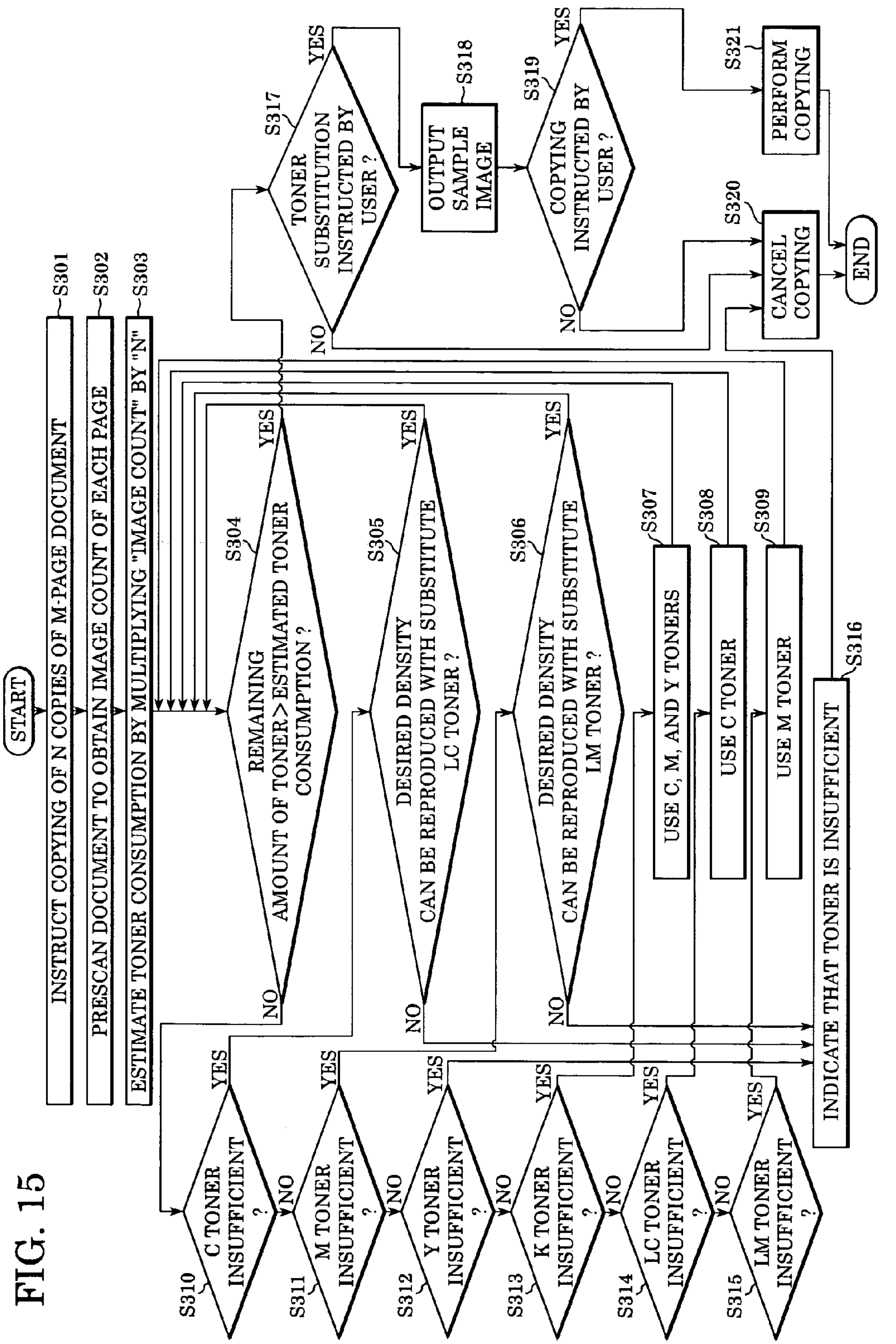
FIG. 15 is a flowchart showing copy processing by an MFP according to a third embodiment of the present invention.

FIG. 15 is a flowchart showing copy processing by the MFP 204 according to a third embodiment of the present invention. The following description mainly focuses on processing different from the processing described according to the first embodiment.

Referring to FIG. 15, according to this embodiment, if a determination is made in step S304 that the remaining amount of toner exceeds the estimated consumption if toner substitution is performed, in step S317 the user is asked whether or not to perform copying with a substitute toner on the display unit 110. If the user instructs toner substitution, in step S318 a sample copy of, for example, the first page is output. This enables the user to determine whether or not the copy image with the substitute toner is acceptable based on the output sample result. More specifically, the user can determine whether or not copying with the substitute toner is acceptable by viewing an actual sample of the output image with the substitute toner, which differs depending on the density distribution of the output image and the type of substitute toner.

Next, if the user accepts to perform copying with the substitute toner in step S319, all copies are output with the substitute toner in step S321. In contrast, if the user does not accept to perform copying with the substitute toner, copying is cancelled in step S320.

The image size of the output sample image may be the same as or smaller than that of an actual copy. Toner consumption can be reduced by outputting a reduced-size sample image.

Fourth Embodiment

According to a fourth embodiment of the present invention, if a determination is made that the remaining amount of a toner is not sufficient, the user is presented with thumbnails of the images, so that the user can determine images to be output with a substitute toner.

Figure 16:
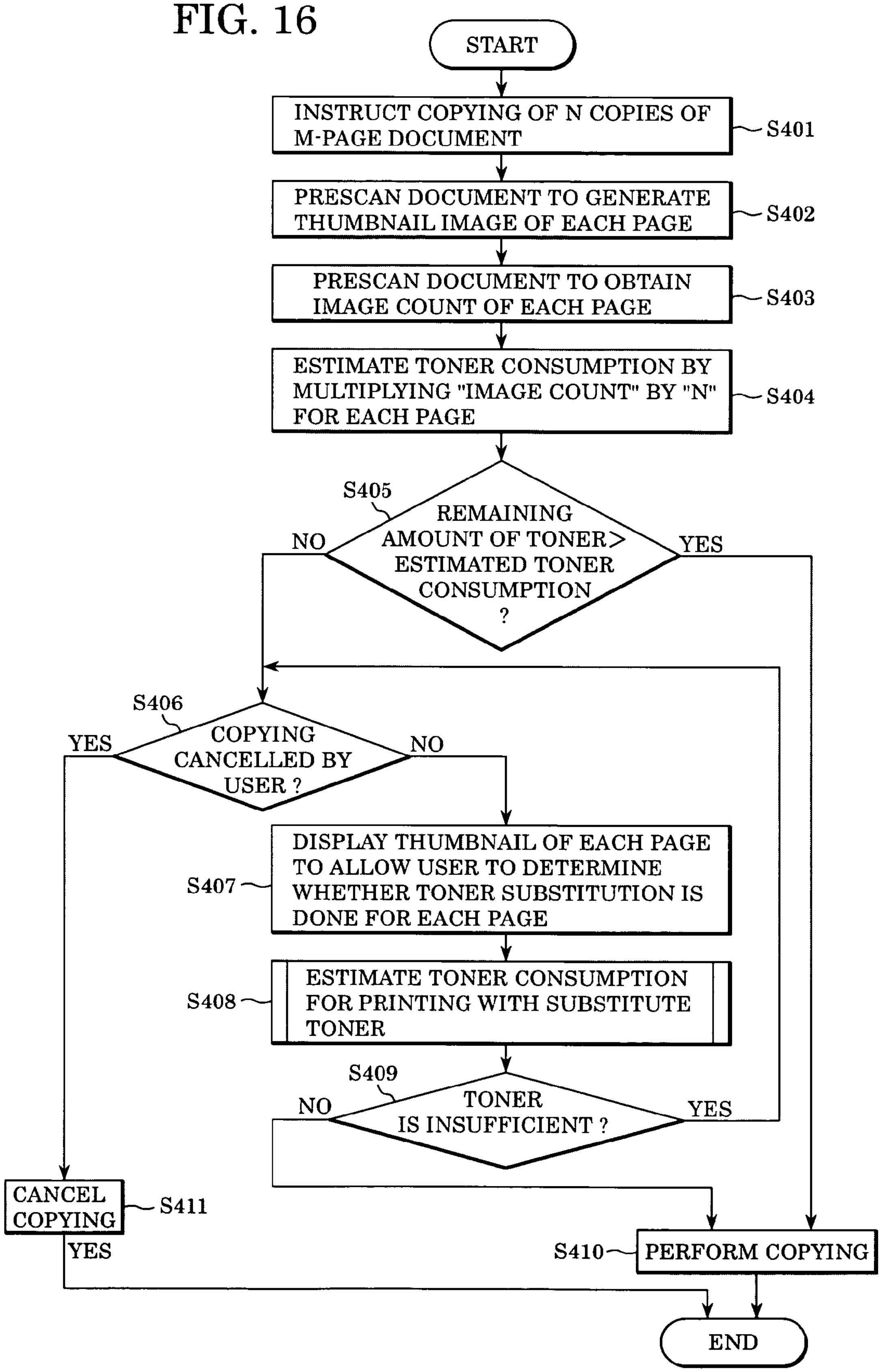
FIG. 16 is a flowchart showing copy processing by an MFP according to a fourth embodiment of the present invention.

FIG. 16 is a flowchart for copy processing by the MFP 204 according to this embodiment. The following description mainly focuses on processing different from the processing described according to the first embodiment.

In step S402, thumbnail data of m pages of a document that has been read in advance with the scanner 101 are generated. The generated thumbnail data of each page is stored in a predetermined storage device.

If a determination is made in step S405 that the amount of a toner is insufficient, in step S406 the user is asked on the display unit 110 whether or not to accept copying with a substitute toner. If the user specifies to accept copying with a substitute toner, in step S407 the user is sequentially presented with the thumbnails of the pages on the display unit 110 based on the thumbnail data generated in step S402, and thus the user specifies the images to be output with the substitute toner by selecting from among the thumbnail images displayed on the display unit 110. The pages not selected in step S407 are not copied. Then in step S408, the images of the selected pages are subjected to the same processing as that in steps S110 to S115 and S105 to S109 shown in FIG. 11. More specifically, a second distribution or color conversion for copying with the substitute toner is carried out and an estimated consumption of the toner after copying with the substitute toner is calculated.

According to the above-described embodiment, images to be output with the substitute toner can be selected according to the content of the images. This provides the user with a print system which is more flexible in a situation where a toner runs out or the amount of a toner becomes insufficient.

Although this embodiment has been described by way of an example of copying, images to be subjected to PDL printing with a substitute toner can also be specified from among displayed thumbnails.

Fifth Embodiment

In the first embodiment, if a density change key is pressed during copying, the flow may return to step S102, where toner substitution may be performed from the beginning based on the changed density for copying with a substitute toner.

Alternatively, if a density change key is pressed during copying, this command may be overridden to reject a change of density. This ensures that all copies are output with the determined density, i.e., the determined remaining amount of toner.

Sixth Embodiment

In the first and second embodiments, another job, such as a PDL print job, may be prevented from interrupting the copying or printing in progress. This ensures that all copies are output with the determined density, i.e., the determined remaining amount of toner.

Seventh Embodiment

In the first and second embodiments, if a failure, such as a paper jam, occurs during copying or printing, recovery from the failure causes the toner consumption to increase, and hence the estimated consumption of toner may be re-calculated, and the subsequent processing may be terminated if the calculation result differs from the original estimate by a predetermined magnitude or more. In case of an insufficient amount of toner, a message indicating that the amount of a toner is insufficient may be displayed on the operating panel of the MFP 204 or the client PC may be informed that the amount of a toner is insufficient.

Eighth Embodiment

In the first and second embodiments, estimated toner consumption may be calculated assuming that calibration interrupts copying or printing in progress.

Alternatively, calibration during copying or printing may be disabled. This ensures that all copies are output with the same imaging conditions by preventing the imaging conditions from being changed during copying or printing.

Other Embodiments

Although the above-described embodiments have been described with a printing apparatus that uses toner as a recording agent, the present invention is not limited to such a printing apparatus. For example, the present invention can be applied to an ink-jet printing apparatus that uses ink as a recording agent.

In addition, the present invention can also be achieved by supplying software program code which realizes the functions of the above-described embodiments shown in FIGS. 11 and 14 to 16 to a computer in a system or an apparatus connected to various devices that operate to achieve the functions of the above-described embodiments, and then having the computer (the CPU or the MPU) of the system or apparatus operate the devices according to the supplied program code.

In this case, the software program code itself realizes the functions of the embodiments, and therefore, the program code itself and means for supplying the program code, such as a recording medium containing the program code, are covered by the present invention.

The recording medium for supplying the program code includes a Floppy® Disk, a hard disk, an optical disk, a magneto-optical disk, a CD-ROM, a magnetic tape, a non-volatile memory card, and a ROM.

As described above, the functions of the above-described embodiments are achieved by the execution of the program code read by the computer. In addition, the functions of the above-described embodiments may also be achieved by, for example, the OS (operating system) or other application software running on the computer such that the program code achieves the functions of the above-described embodiments in cooperation with the OS or the other application software.

Furthermore, the functions of the above-described embodiments may also be achieved such that the program code is written to a memory provided in an expansion card disposed in the computer or an expansion unit connected to the computer, and then, for example, the CPU provided on the expansion card or the expansion unit performs all or part of the processing based on commands in the program code.

With the above-described structure, if one recording agent is substituted for another recording agent for printing, the consumption of the substitute recording agent required to print out a predetermined unit (or group) of print data for continuous printing is estimated, and the estimated consumption of the substitute recording agent is compared with the remaining amount of the substitute recording agent. If the comparison result indicates that the remaining amount of the substitute recording agent is more than the estimated consumption, the predetermined unit of print data is printed out. Thus, printing with the substitute recording agent is performed starting with the first page of the predetermined unit of print data, and furthermore, all pages in the predetermined unit of print data are printed with the substitute recording agent. This prevents the image quality from differing among pages of the predetermined unit of print data because there is no possibility of the amount of recording agent becoming insufficient before the printing of the predetermined unit of print data is completed.

As a result, even if the printing apparatus encounters a situation where a recording agent runs out or the amount of a recording agent becomes insufficient, the printing apparatus can continue printing without causing a change in image quality between before and after this situation.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-409651 filed Dec. 8, 2003, which is hereby incorporated by reference herein.

What is claimed is:

1. An apparatus for making a printing apparatus print a plurality of pages with a plurality of recording agents including a dark recording agent and a light recording agent, the apparatus comprising:

a first obtaining unit configured to obtain a density value corresponding to the dark recording agent and a density value corresponding to the light recording agent for each pixel;

a second obtaining unit configured to obtain an amount of the dark recording agent that the printing apparatus will use, in the case that the dark recording agent is not substituted with the light recording agent, based on the obtained density value corresponding to the dark recording agent;

a determining unit configured to determine whether the remaining amount of the light recording agent is less than the amount of the light recording agent that the printing apparatus will use to print each page in the case that the remaining amount of the dark recording agent is less than the obtained amount of the dark recording agent;

a display unit for displaying thumbnail images of the plurality of pages when at least one of (i) the remaining amount of the dark recording agent is less than the obtained amount of the dark recording agent, and (ii) the remaining amount of the light recording agent is less than the amount of the light recording agent that the printing apparatus will use;

a selection unit to receive a selection of at least one of the thumbnail images displayed on the display unit; and a making unit making the printing apparatus print one or more of the plurality of pages with the light recording agent in the case that the remaining amount of the light recording agent is not less than the amount of the light recording agent that the printing apparatus will use, wherein the making unit instructs the printing apparatus to print only those pages corresponding to the at least one thumbnail image selected via the selection unit, and does not instruct the printing unit to print any pages corresponding to unselected thumbnail images.

2. A method for making a printing apparatus print a plurality of pages with a plurality of recording agents including a dark recording agent and a light recording agent, the method comprising:

obtaining a density value corresponding to the dark recording agent and a density value corresponding to the light recording agent for each pixel;

obtaining an amount of the dark recording agent that the printing apparatus will use, in the case that the dark recording agent is not substituted with the light recording agent, based on the obtained density value corresponding to the dark recording agent;

determining whether the remaining amount of the light recording agent is less than the amount of the light recording agent that the printing apparatus will use to print each page in the case that the remaining amount of the dark recording agent is less than the obtained amount of the dark recording agent;

displaying thumbnail images of the plurality of pages when at least one of (i) the remaining amount of the dark recording agent is less than the obtained amount of the dark recording agent, and (ii) the remaining amount of the light recording agent is less than the amount of the light recording agent that the printing apparatus will use;

selecting at least one of the displayed thumbnail images; and making the printing apparatus unit print one or more of the plurality of pages with the light recording agent in the case that the remaining amount of the light recording agent is not less than the amount of the light recording agent that the printing apparatus will use, wherein the printing apparatus is instructed to print only those pages corresponding to the at least one selected thumbnail image, and is not instructed to print any pages corresponding to unselected thumbnail images.

* * * * *